United States Patent
Neels et al.

(10) Patent No.: US 12,029,232 B2
(45) Date of Patent: Jul. 9, 2024

(54) APPARATUS FOR DRYING FOOD PRODUCTS

(71) Applicant: Moba Group B.V., Barneveld (NL)

(72) Inventors: Willem Frans Neels, Lochem (NL); Willem Henri Hanekamp, Heerde (NL); Johannes Michiel Maria Bekelaar, Arnhem (NL)

(73) Assignee: Moba Group B.V., Barneveld (NL)

( * ) Notice: Subject to any disclaimer, the term of this patent is extended or adjusted under 35 U.S.C. 154(b) by 826 days.

(21) Appl. No.: 16/972,028

(22) PCT Filed: Jun. 5, 2019

(86) PCT No.: PCT/NL2019/050337
§ 371 (c)(1),
(2) Date: Dec. 4, 2020

(87) PCT Pub. No.: WO2019/235927
PCT Pub. Date: Dec. 12, 2019

(65) Prior Publication Data
US 2021/0259295 A1     Aug. 26, 2021

(30) Foreign Application Priority Data
Jun. 5, 2018 (EP) .................................... 18020248

(51) Int. Cl.
*A23N 12/08*     (2006.01)
*A23B 7/02*     (2006.01)
(Continued)

(52) U.S. Cl.
CPC ............ *A23N 12/08* (2013.01); *A23B 7/0205* (2013.01); *F26B 3/04* (2013.01); *F26B 15/12* (2013.01);
(Continued)

(58) Field of Classification Search
CPC .................................................... A23B 7/0205
See application file for complete search history.

(56) References Cited

U.S. PATENT DOCUMENTS

| | | | |
|---|---|---|---|
| 1,346,986 A | 7/1920 | Stamm | |
| 1,531,865 A | 3/1925 | McNiel | |

(Continued)

FOREIGN PATENT DOCUMENTS

| | | |
|---|---|---|
| JP | A-1982090569 | 6/1982 |
| JP | H-0539262 | 5/1993 |

(Continued)

OTHER PUBLICATIONS

International Search Report for PCT/NL2019/050337 dated Sep. 12, 2019.

(Continued)

*Primary Examiner* — Jason Lau
(74) *Attorney, Agent, or Firm* — Stephen J. Weyer, Esq.; Stites & Harbison PLLC

(57) ABSTRACT

The present invention relates to an apparatus for drying food products, for example fruit or eggs, comprising; •—a tunnel section as dryer compartment (10) with supply unit and discharge unit for dryer gas, with the dryer gas being blown on the products substantially from above, and •—a roller conveyor (1) with at least one row of supply rollers (3) for thereon conveying wet products in a conveying direction T to, through, and away from the dryer compartment (10), wherein the dryer compartment (10) comprises for the row a corresponding at least one ceiling element (14) with a curvature in line with that of the product, while in the ceiling element (14) at least one slit (15) is provided, directed substantially transversely to the conveying direction T, for blowing in the dryer gas.

12 Claims, 2 Drawing Sheets

Figure 1:
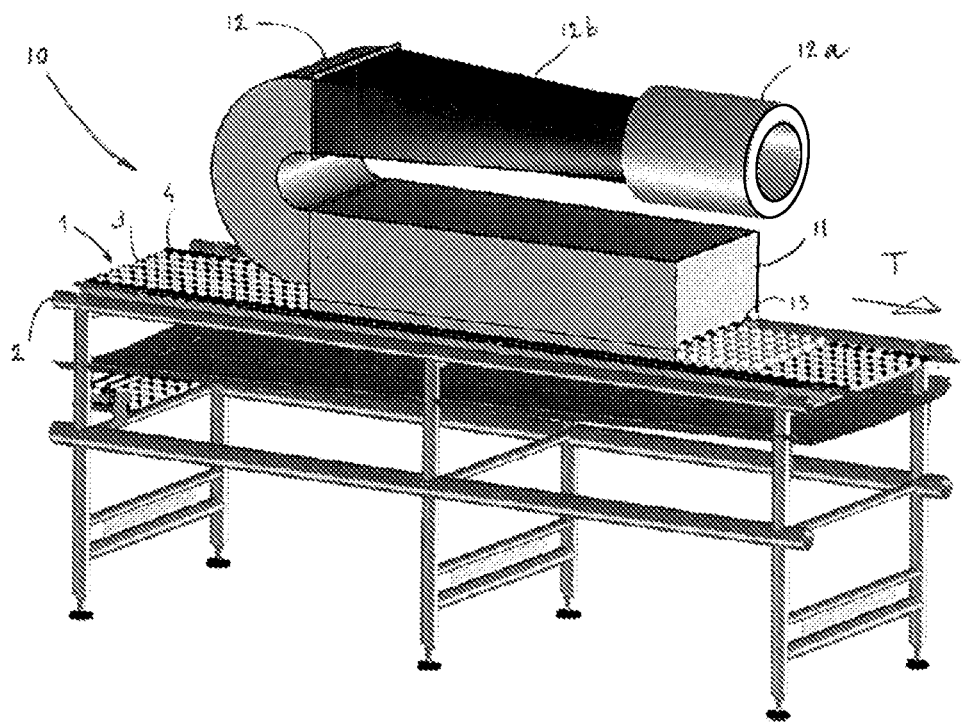

(51) Int. Cl.
 *F26B 3/04* (2006.01)
 *F26B 15/12* (2006.01)
 *F26B 21/00* (2006.01)

(52) U.S. Cl.
 CPC ........ *F26B 21/004* (2013.01); *A23V 2002/00* (2013.01)

(56) References Cited

U.S. PATENT DOCUMENTS

| | | |
|---|---|---|
| 4,173,831 A | 11/1979 | McCord |
| 4,352,249 A | 10/1982 | Rose |
| 6,357,140 B1 | 3/2002 | Heyer et al. |
| 2011/0094122 A1 | 4/2011 | Webb et al. |
| 2013/0286097 A1* | 10/2013 | De Brabander ....... B41J 2/1433 438/21 |

FOREIGN PATENT DOCUMENTS

| | | |
|---|---|---|
| JP | 2002193221 | 7/2002 |
| KR | 20150012553 A * | 2/2015 |

OTHER PUBLICATIONS

First Office Action dated Mar. 7, 2023 in corresponding Japanese Application No. 2020-566658.
Preliminary Search Report dated Jun. 19, 2023 in corresponding Brazilian Application No. BR112020024234-9.

* cited by examiner

APPARATUS FOR DRYING FOOD PRODUCTS

The present invention relates to an apparatus for drying food products, for example, fruit or eggs, comprising,
- a tunnel section as dryer compartment with feed unit and discharge unit for dryer gas, with dryer gas being blown on the products substantially from above, and
- a roller conveyor with at least a single row of feed rollers for thereon conveying wet products in a conveying direction T to, through, and away from the dryer compartment.

The apparatus is, for example, an apparatus for washing and drying food products, for example, a dryer. An apparatus of this type is known from U.S. Pat. No. 4,173,831. In this patent document, it is described how eggs, located on rows of spinning rollers of an endless roller conveyor, after being washed, are passed in a conveying direction through a dryer. This dryer comprises a tunnel cover which is placed over a particular part of this roller conveyor and closes off this part of the conveyor, except where the eggs enter and exit the dryer. In particular, well above the eggs, in the ceiling of this cover, in the conveying direction, next to each other, U-shaped profile members are arranged. These profile members have been mounted with respect to each other such that at the U-ends elongated orifices are obtained. Upon supply of air from above to these profile members, these orifices function as nozzles, to be regarded as elongated air knives. It has been found that such an air knife provides the possibility of spreading, and thereby typically attenuating, residues of water on an egg at the blowing location. Nonetheless, often thin films are left behind, and even more often drops of water at the egg ends.

From U.S. Pat. No. 6,357,140, also a dryer compartment on a roller conveyor is known, equipped with nozzles for blowing eggs dry after washing, with the nozzles directed substantially at the egg ends. To counteract the drop formation occurring there, extra brushes and suction lines have been arranged which brush off and suction off drops on these egg ends and on the rollers.

It has been found not only that such drying leaves to be desired but also that a comparatively great deal of energy is used to realize drying to this level.

To further improve the drying of such products after washing, the present invention provides an apparatus as indicated above, that is characterized in that the dryer compartment comprises for the row mentioned a corresponding at least single ceiling element with a curvature in line with that of such a product, while in the ceiling element at least a single slit is provided, directed substantially transversely to the conveying direction, for blowing in the dryer gas.

In this manner, drying can be improved, and the food products can be dried efficiently, while energy consumption is relatively low.

According to a further elaboration, a number of ceiling elements arranged in the conveying direction one after the other constitute a covering profile for a single row as mentioned.

According to a further elaboration, a number of ceiling elements arranged perpendicular to the conveying direction next to each other constitute a covering profile for said number of such rows.

According to a further elaboration, a single ceiling element is arranged over substantially the whole length of the dryer compartment mentioned.

According to an especially advantageous elaboration, the slit mentioned is comprised as an end of a gas supply profile element. The gas supply profile element preferably comprises a funnel. The funnel preferably comprises a substantially oval-shaped symmetry in alignment with the slit with substantially line-shaped opening.

According to a further elaboration, such a ceiling element comprises a substantially oval-shaped profile.

According to a further elaboration, the covering profile comprises a substantially oval-shaped profile.

The dryer compartment may be provided, for example, with a ceiling with a series of arcuate slits, to blow in drying gas towards the roller conveyor.

According to a further elaboration, the slits may be provided alternately next to and after each other, with one slit substantially on one side of a longitudinal median plane of the series and with the—as viewed in conveying direction—next slit, by contrast, substantially on the other side of that median plane.

Furthermore, an aspect of the invention provides a method for drying products, for example using an apparatus according to the invention, wherein:
- products are passed through a dryer compartment by a roller conveyor;
- dryer gas is blown on the products substantially from above, via at least one, and preferably a series thereof, arcuate slit of at least one ceiling element of the dryer compartment, while the ceiling element and respective at least one slit preferably have a bent shape which corresponds to or is in line with a curvature of the products to be dried.

Figure 2:
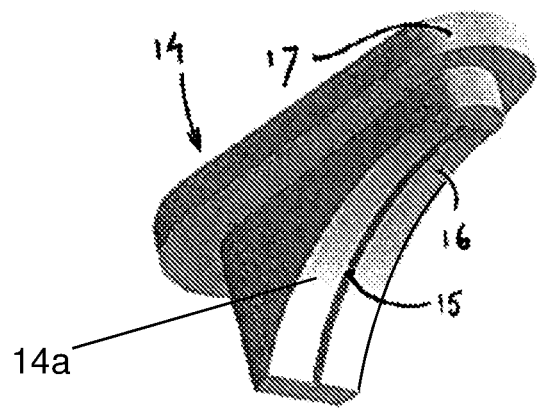
Figure 3:
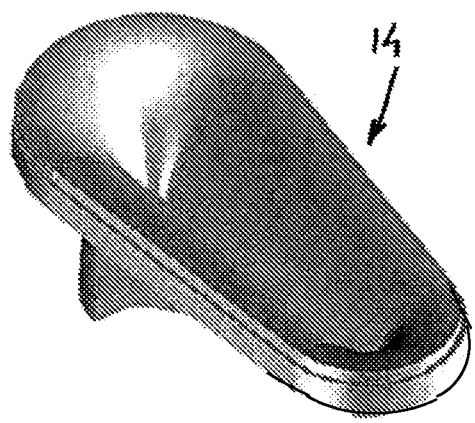
Figure 4:
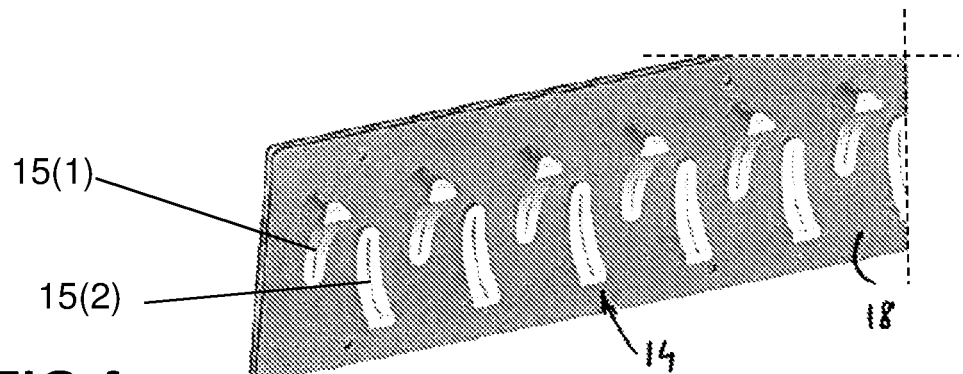
Figure 5:
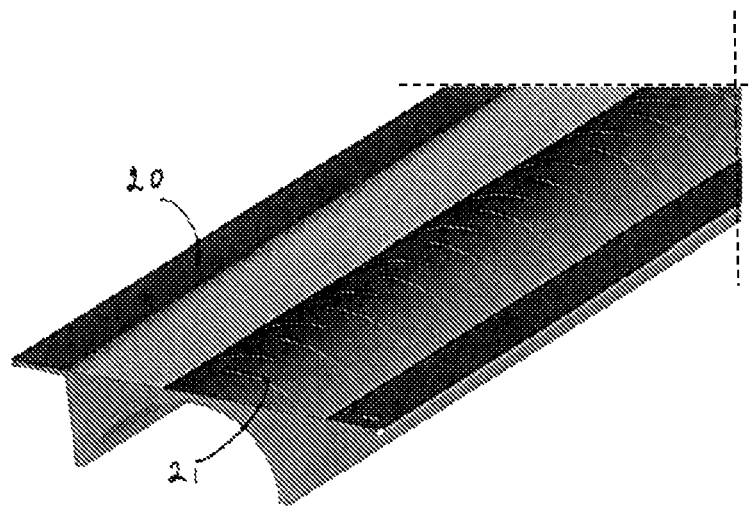
Figure 6:
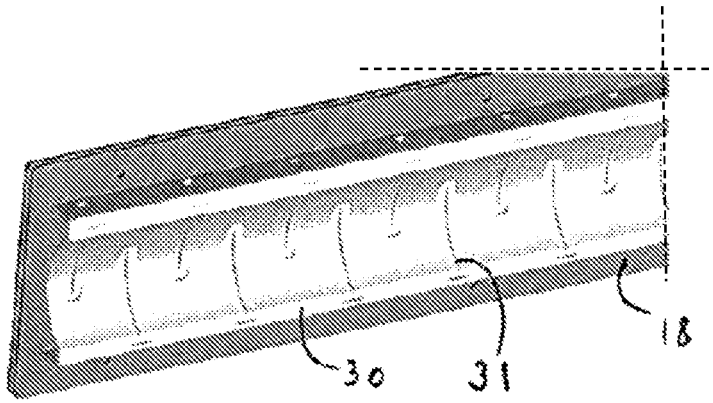

The invention will now be elucidated in more detail on the basis of a drawing, where FIG. 1 is an isometric view of an apparatus according to an example of the present invention;

FIGS. 2 and 3 are isometric views of an exemplary embodiment of a ceiling element according to the present invention, in particular a ceiling element of the apparatus shown in FIG. 1;

where, furthermore, there is shown in FIG. 4 an isometric view of a further part of the dryer compartment of the apparatus shown in FIG. 1; and where in FIGS. 5 and 6 there are depicted, in isometric views, further exemplary embodiments of further parts of a ceiling of an apparatus according to the present invention.

In the various FIGURES the same or corresponding numerals and signs refer to the same or corresponding respective parts.

The figures show an apparatus for drying food products, for example fruit or eggs, for example an apparatus for drying washed, more specifically, wet food products. In the present exemplary embodiment shown, the apparatus is used to dry eggs E. The apparatus is provided with a tunnel section as dryer compartment 10 with feed unit and discharge unit for dryer gas, the dryer gas (during operation) being blown on the products substantially from above, which is further elucidated below.

Further, the apparatus comprises a roller conveyor 1 with at least a single row of feed rollers 3 for thereon conveying wet products in a conveying direction T to, through, and away from the dryer compartment 10.

With great advantage, the dryer compartment 10 comprises for the row mentioned (in particular above the respective row of feed rollers 3) at least one ceiling element 14 with a curvature in line with the curvature of a product to be dried. In the ceiling element 14, at least a single slit 15 is provided, directed substantially transversely to the conveying direction, for blowing in the dryer gas (in the direction of the roller conveyor 10 extending thereunder).

As follows in particular from FIG. 1, the eggs E are conveyed on the roller conveyor 1 (during use) in the conveying direction T to, through, and away from dryer compartment 10. As is generally known, the eggs E, in the case of a roller conveyor 1, lie on so-called hourglass-shaped rollers 3 which, in the FIG. 1 shown, constitute juxtaposed rows (six rows, in this example) and are mounted on shafts 4. These shafts are connected on both sides with endless chains which are driven, for instance at one of the ends of the conveyor 1, with chain wheels connected with a driving motor. Where necessary, these shafts can be rotated in a manner known to one skilled in the art, so that the eggs E, each located on two successive rollers, are likewise rotated. The whole of this conveyor 1 is arranged and mounted in a carriage or frame 2. Most clearly, this apparatus is shown in an isometric view thereof in this FIG. 1.

The dryer compartment 10 mentioned comprises a housing 11, while in the exemplary embodiment shown here a dryer gas control unit 12 is arranged on top of this housing 11. It is indicated how this dryer compartment 10 is placed over the rollers 3 (i.e., over or above the roller conveyor 1), while the eggs E located on these rollers 3 are passed through it, through tunnel openings 13 matching the shape of these eggs E. Indicated schematically in this FIG. 1 are an inlet for dryer gas 12a and a conditioning unit for conditioning the dryer gas 12b. Such conditioning comprises, for example, though not exclusively, the temperature of the dryer gas, the humidity of the dryer gas, and the speed at which the dryer gas is introduced into the housing 11. Most clearly, the exemplary embodiment of the present invention shown here is described for eggs E, but may also be used and applied for any other product that is to be washed (or has been washed), for example another food product, think of fruit or vegetables such as, for example, apples or tomatoes. It is reiterated that application of the apparatus according to present invention is not limited to such food products.

In FIGS. 2 and 3, isometric views are shown of an exemplary embodiment of an above-mentioned ceiling element 14 according to the present invention, in particular a ceiling element 14 of the apparatus shown in FIG. 1. Such a ceiling element 14 comprises a slit (dryer gas outflow slit) 15 through which, during use, the dryer gas is blown to the eggs E passing under the slit (i.e., in the direction of the roller conveyor 1 extending under it). The slit 15 in this example is provided in a ceiling relief piece 16 which has a curvature in line with a curvature of the products to be dried. In the present case, this is the curvature of a cylinder oval, matching the curvature of the eggs E. Preferably, the slit 15 extends in a direction perpendicular to the conveying direction T. In particular, as follows from the drawing, the ceiling element 14 is provided with an underside 14a facing the roller conveyor 1, which includes the slit 15, and which underside 14a is provided with the curvature mentioned (with the downstream end of the slit extending in the above-mentioned direction perpendicular to the conveying direction T in the ceiling element underside 14a).

To give the dryer gas desired approach conditions, the slit 15 in this example forms the end of a funnel-shaped body between the relief piece 16 and a mounting edge 17 (of the present ceiling element 14). As indicated in these figures, such a funnel or funnel-shaped body is substantially symmetrical and oval shaped there where the dryer gas (e.g. air) is introduced into this ceiling element 14 during use. In the exemplary embodiment shown here, the substantially oval-shaped funnel of this ceiling element 14 has, on both long oval sides, sidewalls of unequal height. However, there are also exemplary embodiments that have been tested and applied, where these sidewalls have an approximately equal height. Such exemplary embodiments are understood to be encompassed within the same inventive concept.

In general, the ceiling elements 14 have been mounted next to and after each other over such a row (see for example FIG. 4). Thus, for each row a substantially close-fitting oval-shaped tunnel passage is obtained. It has been found that it is precisely such a passage that guides the blown-in dryer gas in a most suitable manner around the eggs E, as a result of which, moreover, in comparison with that of dryer gas in existing dryer compartments, the residence time of the dryer gas and thus the uptake efficiency of the dryer gas for residual washing liquid is increased. As follows in particular from FIG. 4, the ceiling elements 14 may for instance be set up in a series whereby the ceiling elements 14 viewed in the conveying direction T are positioned alternately, such that a first arcuate gas outflow slit 15(1) extends substantially on a first side of a longitudinal vertical perpendicular median plane of the ceiling element 14, while the next arcuate gas outflow slit 15(2) extends substantially on a second side, opposite to said first side, of the longitudinal vertical perpendicular median plane of the ceiling element 14 (see FIG. 4).

To those skilled in the art it will be clear that, as dryer gas, typically air is used. As mentioned hereinbefore, the conditions such as humidity, flow rate, temperature, and also composition, can be set with the unit 12, more particularly the conditioning unit 12b.

In FIG. 4, there is shown in particular in isometric view a mounting plate or a holder plate 18 for setting up/mounting ceiling elements 14 next to and after each other. In the view of the example according to FIG. 4, a single row is served thereby. Per unit length, counting in the conveying direction T, more or fewer of such elements 14 may be arranged, as desired. The elements shown here have slits 15 which extend over only a part of the width of the row and are thus arranged alternately next to and after each other (as has been described in the above, with one slit substantially on one side of a longitudinal median plane and the (as viewed in the conveying direction T) next slit, by contrast, on the other side of that plane). It is also possible for the slits to extend from one side of the ceiling to the other side, in which case, if there are multiple elements 14, these will be arranged only one after the other.

In FIGS. 5 and 6, in isometric view, further exemplary embodiments are shown of elements for composing a ceiling, in particular a ceiling of the dryer compartment 10 that extends above the roller conveyor 1.

In FIG. 5 the exemplary embodiment comprises a ceiling cover 20 with slits 21 over which the holder plate 18 with ceiling elements 14 can be arranged (in particular such that the slits 21 of the cover 20 coincide with the outflow slits 15 of the ceiling elements 14 for the purpose of gas feed-through towards the roller conveyor 1).

In FIG. 6 there is shown an exemplary embodiment where a ceiling unit 30 with slits 31 is arranged directly on a holder plate 18 as mentioned. As follows from the drawing, the slits 31 of the ceiling unit 30 are arcuate slits which fit onto the slits 15 of the ceiling elements 14 of the holder plate 18 (for the purpose of gas feed-through towards the roller conveyor 1).

It will be clear to one skilled in the art that, provided that a ceiling profile according to the present invention is obtained, combinations of the elements shown, whether or not in one piece, and implemented in suitable material, can be applied. Furthermore, the dimensions of the parts and components shown, and especially the dimensions of the curvature of a profile element and of the length and width of a slit, will be determined, and used, in accordance with the desired drying conditions.

The design as indicated above makes it possible in a simple manner to use a modular structure. Such modules can mutually differ in size and dimensioning and thus comply with the requirements to be met. Furthermore, such a construction mode will considerably facilitate and expedite manufacture and construction.

It will be clear to those skilled in the art that various modifications in respect of the above-outlined set-up and the exemplary embodiments elucidated are understood to be comprised within the scope of protection of the appended claims.

| KEY TO REFERENCE SIGNS | |
|---|---|
| 1 | roller conveyor |
| 2 | frame |
| 3 | hourglass-shaped rollers |
| 4 | shafts |
| 10 | dryer compartment |
| 11 | housing |
| 12 | dryer gas control unit |
| 12a | dryer gas inlet |
| 12b | conditioning unit |
| 13 | tunnel openings |
| 14 | ceiling element |
| 14a | underside ceiling element |
| 15 | slit |
| 16 | ceiling relief piece |
| 17 | mounting edge |
| 18 | mounting plate |
| 20 | ceiling cover |
| 21 | ceiling cover slit |
| 30 | ceiling unit |
| 31 | ceiling unit slit |
| E | eggs |
| T | conveying direction |

The invention claimed is:

1. An apparatus for drying food products having a curvature, such as fruit or eggs, comprising,
   a tunnel section dryer compartment with a feed unit and a discharge unit for dryer gas, with the dryer gas being blown on the products substantially from above, and a roller conveyor with at least a single row of feed rollers for thereon conveying wet products in a conveying direction T to, though, and away from the dryer compartment wherein,
   wherein the dryer compartment is provided with a ceiling with a series of slits, to blow in drying gas in the direction of the roller conveyor,
   wherein the slits are disposed alternately next to an after each other, with one slit substantially on one side of a longitudinal median plane of the series and the—viewed in conveying direction T—next slit substantially on the other side of that median plane.

2. The apparatus according to claim 1, wherein a number of ceiling elements arranged in the conveying direction one after the other constitute a covering profile for a single row.

3. The apparatus according to claim 2, wherein a number of ceiling elements arranged perpendicular to the conveying direction next to each other constitute a covering profile for said number of such rows.

4. The apparatus according to claim 1, wherein a single ceiling element is arranged over substantially the whole length of said dryer compartment.

5. The apparatus according to claim 1, wherein such a ceiling element comprises a substantially oval-shaped profile.

6. The apparatus according to claim 1, wherein a covering profile comprises a substantially oval-shaped profile.

7. The apparatus according to claim 1, wherein at least one of the one slit and the next slit intersect said longitudinal median plane.

8. The apparatus according to claim 1, wherein one or more arcuate slits are each provided, at a downstream end thereof, with a correspondingly arcuate surface which extends substantially along the conveying direction T.

9. The apparatus according to claim 1, wherein the roller conveyor is configured for conveying eggs thereon, comprising hourglass-shaped rollers of the roller conveyor.

10. A method for drying products having a curvature, using an apparatus according to claim 1, wherein:
    products having a curvature are passed through a dryer compartment by a roller conveyor; and
    the dryer gas is blown on the products substantially from above, or a series of, arcuate slits of at least one ceiling element of the dryer compartment.

11. An apparatus according to claim 1, wherein the series of slits is a series of arcuate slits.

12. The apparatus according to claim 1, wherein the dryer compartment comprises for said row a corresponding at least single ceiling element with a curvature, said ceiling element comprising the series of slits, wherein each slit of the series of slits is provided directed substantially transversely to the conveying direction, for blowing in the dryer gas.

* * * * *

UNITED STATES PATENT AND TRADEMARK OFFICE
CERTIFICATE OF CORRECTION

| | | |
|---|---|---|
| PATENT NO. | : 12,029,232 B2 | Page 1 of 1 |
| APPLICATION NO. | : 16/972028 | |
| DATED | : July 9, 2024 | |
| INVENTOR(S) | : Neels et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this
Fifteenth Day of July, 2025

Coke Morgan Stewart
*Acting Director of the United States Patent and Trademark Office*